3,284,442
NOVEL STARCH ESTER DERIVATIVES
Wadym Jarowenko, Plainfield, and Otto B. Wurzburg, White House Station, N.J., assignors to National Starch and Chemical Corporation, New York, N.Y., a corporation of Delaware
No Drawing. Filed Apr. 3, 1962, Ser. No. 184,670
3 Claims. (Cl. 260—233.5)

This invention relates to a method for the preparation of novel starch ester derivatives as well as to the novel derivatives thereby prepared.

It is the object of this invention to provide novel starch ester derivatives characterized by the improved clarity and resistance to gelling on cooling which is displayed by the cooked pastes derived from the water dispersible form of these derivatives. Various other objects and advantages of this invention will be apparent from the following description.

As is well known in the art, a wide variety of starch ester derivatives have heretofore been made for use in applications wherein they give results which are either unattainable, or which are vastly superior to the results obtained, with the use, in these applications, of their corresponding raw starch bases. However, in certain applications wherein it is necessary to prepare formulations of these starch esters with highly alkaline materials, it has been found that many of these starch esters underwent alkaline hydrolysis which resulted in a disruption of their ester linkage. Needless to say, such instability under alkaline conditions is highly undesirable and thus precludes the use of such starch esters in many applications wherein their presence would otherwise have been highly desirable.

We have now found a method for preparing a novel class of starch ester derivatives which display a greater degree of alkali resistance than is normally expected of a starch ester linkage.

The novel derivatives of our invention are the starch esters corresponding to the following structural formulae:

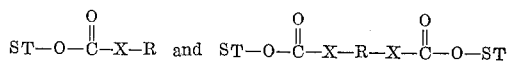

wherein ST represents the starch molecule, X is a radical selected from among the group consisting of oxygen and sulfur radicals, and R is a non-polymerizable radical, i.e. a radical devoid of ethylenic or so called vinyl unsaturation, said non-polymerizable radical being selected from among the group consisting of alkyl and substituted alkyl radicals containing from one to eighteen carbon atoms; aryl and substituted aryl radicals; and, arylalkyl and substituted arylalkyl radicals. Among the various substituent groups which may be present on the above noted substituted alkyl, substituted aryl and substituted arylalkyl groups which are representative of the "R" group in the above formula, one may list substituent groups such as nitro, amino, sulfo, chloro, bromo, iodo and fluoro radicals.

In brief, the preparation of these starch ester derivatives is accomplished by the reaction of starch with a mono- or difunctional chloroformate or chlorothiolformate esterification reagent which is devoid of any ethylenic unsaturation; said reaction being carried out in the presence of a slight stoichiometric excess, with respect to the chloroformate esterification reagent, of an acid acceptor catalyst.

With respect to the chloroformate esterification reagents which may be utilized in this reaction, it is possible to employ any chloroformate corresponding to the following structural formulae:

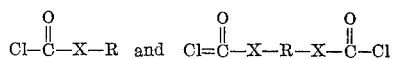

wherein X is a radical selected from among the group consisting of oxygen and sulfur radicals and R is a non-polymerizable radical, i.e., a radical devoid of ethylenic or so-called vinyl unsaturation, said non-polymerizable radical being selected from among the group consisting of alkyl and substituted alkyl radicals containing from one to eighteen carbon atoms; aryl and substituted aryl radicals; and, arylalkyl and substituted arylalkyl radicals. Among the various substituent groups which may be present in the above noted substituted alkyl, substituted aryl, and substituted arylalkyl groups which are representative of the "R" group in the above formula, one may list substituent groups such as nitro, amino, sulfo, chloro, bromo, iodo, and fluoro radicals.

Thus, from the above formula, it is seen that both mono- and difunctional chloroformates or chlorothiolformates are operable in the process of our invention. Moreover, depending upon the specific type of chloroformate which is utilized, it is possible for the practitioner to prepare the starch ester derivatives of our invention in a form wherein they display improved water dispersibility over their corresponding starch bases, or, on the other hand, they may be produced in an inhibited, i.e., cross-linked, and therefore less water dispersible form than their corresponding bases. This variability, on the part of the process of our invention, is easily controlled by the practitioner since he need only select a chlorothiolformate or a difunctional chloroformate in order to produce our ester derivatives in their inhibited, non-water dispersible form whereas the use of a monofunctional chloroformate will result in a substantially uninhibited, readily water dispersible starch ester derivative. In any event, these derivatives, whether water dispersible or cross-linked, are all characterized by their alkali resistance.

The applicable starches which may be used in preparing our novel starch esters may be in either granular or gelatinized form. They may be derived from any plant source including corn, wheat, rice, sago, tapioca, waxy maize, sorghum, waxy sorghum, high amylose corn, potato, sweet potato or the like. Also included are the conversion products derived from any of these starch bases including, for example, dextrines prepared by acid and/or heat hydrolysis; oxidized starches prepared by treatment with oxidants such as sodium hypochlorite; and, fluidity or thin boiling starches prepared by enzyme conversion or by mild acid hydrolysis. In addition, the amylose and amylopectin fractions derived from any of the above noted starch bases may also be utilized. It is also possible to employ, in our process, any medium or low substituted ether or ester derivatives of these starch bases, or of their amylose or amylopectin fractions. Our use of the term "starch" is thus seen to include any amylaceous substances, whether untreated or chemically modified, which still retain free hydroxyl groups capable of entering into the esterification reaction of this invention.

As for the acid acceptor catalysts whose presence is required when conducting the process of our invention, these may be selected from among the group consisting of the alkali metal hydroxides, the alkaline earth hydroxides, the alkali metal carbonates, the alkali metal phosphates, the alkali metal borates, alkyl substituted guanidines such as tetramethyl guanidine, tertiary amines, and quaternary ammonium bases.

The actual reaction conditions which may be utilized in preparing our novel derivatives will vary, for the most part, depending upon the particular starch which is being esterified. Thus, when granular starch bases or their thin boiling or oxidized conversion products are utilized, the reaction may be run as a so-called "milk reaction" wherein the starch is suspended in water or in an inert organic solvent such as dioxane, toluene, or acetone. On the other hand, when pregelatinized or other types of cold water soluble starches, such as dextrines, as well as the amylose and amylopectin fractions of starch or gelatinized starches are reacted, they should, preferably, be in the form of their aqueous colloidal dispersions, said colloidal dispersions being often referred to as "solutions," which may be readily prepared in an aqueous, alkaline medium. Such aqueous, alkaline media, for the preparation of collodial starch dispersions, comprise aqueous solutions containing a stoichiometric excess, with respect to the chloroformate esterification reagent, of a suitable alkali which may be selected from among the group consisting of the alkali metal hydroxides, and alkaline salts such as trisodium phosphate, and quaternary ammonium hydroxides, etc. Although dry, or semi-dry, reactions can also be used, if so desired, it should be noted that reactions of this type ordinarily yield derivatives which are not uniformly substituted.

In the above described milk reactions, the starch is usually suspended in about 1.25 to 1.5 parts of water or inert solvent per part of the starch whereas in dispersion reactions the starch requires about 2 to 15 parts of aqueous alkali per part of starch in order to obtain a workable viscosity. In general, unconverted raw starches will require greater dilution than their corresponding conversion products. Moreover, starches having a higher molecular weight, such as potato, tapioca or waxy maize starch, require greater dilution than lower molecular weight starches such as corn or high amylose corn starch.

With either milk or dispersion systems, the reaction can be conducted at temperatures ranging from about 50° to 120° F. The use of temperatures substantially higher than 120° F. is not advisable in the case of milk reactions since the aqueous suspensions containing the resulting derivatives would ordinarily swell and thus present the practitioner with recovery problems which would not otherwise be encountered when these milk reactions are run at temperatures below 120° F. Although the dispersion reactions could probably be conducted at temperatures above 120° F., the use of such higher temperatures is not advised as it is felt that the ester derivatives of our invention would probably undergo some decomposition under these conditions.

In conducting the reaction with either a milk or dispersion system, the starch is usually first suspended or dispersed in the selected aqueous or non-aqueous reaction medium. The acid acceptor followed by the chloroformate esterification reagent is then introduced whereupon the resulting reaction mixture is mechanically agitated until all or most of the chloroformate is consumed. Depending upon conditions, the reaction time may vary from about 0.25 up to about 16 hours. Thus, the shortest reaction times will be attainable during dispersion reactions, and during controlled pH reactions, i.e., where a constant pH is maintained during the course of the reaction by the intermittent addition of a base which is capable of maintaining the reaction mixture at the desired pH level. On the other hand, the longest reaction times will usually involve those reactions which are conducted at room temperature, i.e., at about 70° F.

Upon the completion of the reaction, a suitable separation procedure would involve the acidification of the reaction mixture to a pH in the range of about 6.5 to 7.0, using any desired acid such, for example, as acetic, dilute sulfuric or dilute hydrochloric acid. In those cases where the resulting starch ester is water insoluble, it may then be recovered either by filtration, drum drying or spray drying and subsequently washed free of residual salts. Where the derivative is, instead, cold water soluble, it may then be recovered by being streamed into alcohol whereupon it will be effectively precipitated and thus freed from any residual salts.

With respect to proportions, the concentration of the chloroformate esterification reagent may range from about 1 to 100% by weight of the starch depending upon the specific reagent which is to be utilized as well as upon the desired properties of the resulting product. Generally more water insoluble products will be obtained with the use of increasingly higher concentrations of any given chloroformate reagent. As noted earlier, the acid acceptor catalyst should be present in a concentration amounting to a slight stoichiometric excess over the chloroformate reagent.

The novel starch esters of our invention are, of course, most noteworthy for their outstanding stability and resistance to alkaline degradation. Thus, the cooked pastes derived from the water dispersible form of these esters display improved clarity and have good resistance to gelling on cooling. In the ungelatinized state, these esters retain their improved stability, in contrast to their corresponding underivatized bases, even after prolonged treatment with cold, diluted alkali. These highly desirable properties permit the derivatives of our invention to be widely utilized as, for example, in various sizing, coating, thickening and adhesive applications.

The following examples will further illustrate the embodiment of our invention. In these examples, all parts given are by weight unless otherwise noted.

*Example I*

This example illustrates the use of various chloroformate esterification reagents in preparing the novel starch esters of our invention by means of milk reactions wherein the resulting products display an intact granule structure.

In preparing these derivatives, the basic procedure which was followed comprised the suspension of the respective starch bases in 1.25 to 1.5 parts of water per each part of starch whereupon the indicated amounts of the selected acid acceptor catalyst followed by the chloroformate esterification reagent were introduced. The reaction would then proceed, under agitation, for the required period and at the desired temperature. The resulting starch ester derivatives were then acidified with dilute sulfuric acid, recovered by filtration and subsequently washed with water to remove residual salts.

The following table presents the pertinent data relating to the various derivatives which were prepared and also lists any variations from the above described procedure. Unless otherwise noted, the starch base utilized in each case was raw corn starch. In all cases the resulting starch ester derivatives were found to display an improved degree of resistance to alkaline hydrolysis. With the exception of derivatives #'s 39–42, these products were all water dispersible and they all exhibited improved stability in comparison with their corresponding underivatized bases.

| Derivative Number | Esterification Reagent | | Acid Acceptor Catalyst | | Reaction Conditions | |
|---|---|---|---|---|---|---|
| | Name | Percent on Starch | Name | Percent on Starch | Temp., °F. | Time, Hours |
| 1 a | Methyl chloroformate | 1.0 | NaOH | 0.45 | 70 | 0.25 |
| 2 | ----do---- | 1.0 | Na₂CO₃ | 10.0 | 90 | 16.0 |
| 3 | ----do---- | 5.0 | Na₂CO₃ | 10.0 | 90 | 16.0 |
| 4 a | ----do---- | 5.0 | NaOH | 2.5 | 70 | 0.5 |
| 5 a | Ethyl chloroformate | 1.0 | NaOH | 0.3 | 70 | 0.5 |
| 6 | ----do---- | 1.0 | Na₂CO₃ | 10.0 | 90 | 16.0 |
| 7 | ----do---- | 5.0 | Na₂CO₃ | 10.0 | 90 | 16.0 |
| 8 a | ----do---- | 5.0 | NaOH | 1.76 | 70 | 1.0 |
| 9 | Isopropyl chloroformate | 3.0 | Mg(OH)₂ | 2.0 | 70 | 16.0 |
| 10 | ----do---- | 3.0 | Na₂CO₃ | 2.6 | 90 | 16.0 |
| 11 | ----do---- | 6.0 | Na₂CO₃ | 5.2 | 110 | 16.0 |
| 12 | ----do---- | 6.0 | Mg(OH)₂ | 3.0 | 70 | 16.0 |
| 13 | ----do---- | 12.0 | Mg(OH)₂ | 4.0 | 70 | 16.0 |
| 14 | ----do---- | 12.0 | Na₂CO₃ | 10.4 | 100 | 16.0 |
| 15 a b | ----do---- | 5.0 | NaOH | 3.6 | 70 | 0.5 |
| 16 a c | ----do---- | 5.0 | NaOH | 3.76 | 70 | 0.5 |
| 17 a | Phenyl chloroformate | 1.0 | NaOH | 0.385 | 70 | 0.5 |
| 18 a | ----do---- | 5.0 | NaOH | 1.89 | 70 | 0.5 |
| 19 b | 2-chloroethyl chloroformate | 5.0 | NH₄OH | 2.96 | 70 | 0.5 |
| 20 | n-butyl chloroformate | 2.0 | NaCO₃ | 2.0 | 110 | 16.0 |
| 21 | ----do---- | 5.0 | Mg(OH)₂ | 2.0 | 70 | 16.0 |
| 22 e | ----do---- | 5.0 | Ca(OH)₂ | 2.0 | 70 | 16.0 |
| 23 b | ----do---- | 5.0 | NaOH | 2.5 | 70 | 16.0 |
| 24 f | ----do---- | 5.0 | (C₂H₅)₃N | 4.0 | 70 | 16.0 |
| 25 | ----do---- | 6.0 | Na₂CO₃ | 6.0 | 110 | 16.0 |
| 26 a | Isobutyl chloroformate | 1.0 | NaOH | 0.24 | 70 | 0.75 |
| 27 | ----do---- | 2.0 | Na₂CO₃ | 2.0 | 110 | 16.0 |
| 28 a | ----do---- | 5.0 | NaOH | 0.95 | 70 | 2.0 |
| 29 | ----do---- | 6.0 | Na₂CO₃ | 6.0 | 110 | 16.0 |
| 30 g | n-Hexyl chloroformate | 2.5 | NaOH | 0.8 | 70 | 16.0 |
| 31 g | ----do---- | 5.0 | Ca(OH)₂ | 2.5 | 70 | 16.0 |
| 32 f | ----do---- | 5.0 | Ca(OH)₂ | 2.5 | 70 | 16.0 |
| 33 f | ----do---- | 4.0 | Na₂CO₃ | 3.0 | 115 | 16.0 |
| 34 g | ----do---- | 4.0 | Na₂CO₃ | 3.0 | 115 | 16.0 |
| 35 | ----do---- | 4.0 | Na₂CO₃ | 3.0 | 115 | 16.0 |
| 36 a | ----do---- | 5.0 | Na₂CO₃ | 3.0 | 70 | 1.0 |
| 37 e | Isopropyl chloroformate | 15.0 | Na₃PO₄ | 17.4 | 120 | 16.0 |
| 38 e | ----do---- | 15.0 | Tetramethyl guanidine | 14.1 | 70 | 16.0 |
| 39 h | Ethyl chlorothiolformate | 21.0 | Na₂CO₃ | 2.4 | 100 | 16.0 |
| 40 h | ----do---- | 20.0 | Na₂CO₃ | 24.0 | 100 | 16.0 |
| 41 h | Phenyl chlorothiolformate | 2.0 | Na₂CO₃ | 1.6 | 100 | 16.0 |
| 42 h | ----do---- | 20.0 | Na₂CO₃ | 16.0 | 100 | 16.0 |
| 43 i | p-Nitrobenzyl chloroformate | 5.0 | NaOH | 1.05 | 70 | 18.0 |
| 44 g | Oleyl chloroformate | 10.0 | Ca(OH)₂ | 4.0 | 100 | 16.0 |
| 45 h | Monoethylene glycol dichloroformate | 5.0 | Ca(OH)₂ | 4.0 | 70 | 16.0 |
| 46 h | ----do---- | 10.0 | Ca(OH)₂ | 4.0 | 70 | 16.0 |

The following further explains the exponent a to i designations of some of the above derivatives:

a pH maintained at value of 8.0 during the course of the reaction by the intermittent addition of small portions of a 3% aqueous NaOH solution.

b In place of raw corn starch, the starch base used in this reaction was a thin boiling corn starch prepared by the acid hydrolysis of corn starch to a degree known in the trade as 75 fluidity.

c In place of raw corn starch, the starch base used in this reaction was a thin boiling corn starch prepared by the hypochlorite oxidation of corn starch to a degree known in the trade as 75 fluidity.

d pH maintained at value of 6.0 during the course of the reaction by the intermittent addition of small portions of NH₄OH.

e In place of raw corn starch, the starch base used in this reaction was potato starch.

f In place of raw corn starch, the starch base used in this reaction was waxy maize starch.

g In place of raw corn starch, the starch base used in this reaction was a thin boiling waxy maize starch prepared by the acid conversion of waxy maize starch to a degree known in the trade as 85 fluidity.

h This derivative was a non-water dispersible, inhibited, i.e., crosslinked, product.

i pH maintained at value of 9.0 during the course of the reaction by the intermittent addition of small portions of a 3% aqueous NaOH solution.

*Example II*

This example illustrates the use of high concentrations of three different chloroformate esterification reagents in preparing the novel esters of our invention which, in this case, were made with an amylose base by means of a dispersion reaction technique wherein the resulting products were water insoluble.

In preparing these derivatives, the procedure utilized involved dispersing the amylose, derived from the fractionation of potato starch, in a 5%, by weight, aqueous solution of sodium hydroxide whereupon 25%, on the weight of the amylose, of a sodium hydroxide acid acceptor catalyst followed by 100%, on the weight of amylose, of the respective chloroformate reagents were introduced. The chloroformates used in preparing these three derivatives were, respectively, isopropyl chloroformate, n-butyl chloroformate, and ethyl chloroformate. In each case, the reaction was run, under agitation, at 72° F. for a period of 1 hour. The resulting water insoluble derivatives were then acidified with hydrochloric acid, recovered by filtration and subsequently washed free of residual salts. These starch esters were all found to display an outstanding resistance to alkaline hydrolysis and could be dissolved in dimethyl formamide.

*Example III*

This example illustrates the preparation of the derivatives of our invention in a milk reaction system wherein the corn starch base was suspended in an inert solvent rather than in water. In this case the resulting derivatives again displayed an intact granule structure.

In preparing these derivatives, the procedure utilized involved the suspension of the corn starch base in 1.25 parts of dioxane whereupon the triethyl amine acid acceptor catalyst followed by the chloroformate reagent, which in this case was nitrobenzyl chloroformate, were introduced. In the two repetitions of this procedure, the concentrations of the catalyst and the chloroformate were, respectively, 8% and 7%; and, 16% and 14%, as based upon the weight of the corn starch base. In each case, the reaction was conducted, under agitation, for 16 hours at a temperature of 120° F. The resulting derivatives were acidified with hydrochloric acid recovered by filtration and were then washed with water to remove residual salts. These products were found to display an outstanding resistance to alkaline hydrolysis.

*Example IV*

This examples illustrates the preparation of the derivatives of our invention by means of a semi-dry reaction wherein the resulting cold water soluble product no longer displayed an intact granule structure.

In preparing this derivative, the procedure utilized involved the admixture of the dry starch base, which in this case was a thin boiling corn starch which had been acid converted to a degree known in the trade as 75 fluidity, together with 106%, as based upon the weight of the starch, of a sodium carbonate acid acceptor catalyst along with 100%, on the weight of the starch, of methyl chloroformate. The reaction was run at a temperature of 120° F. for a period of 16 hours whereupon the reaction mixture was dispersed in water, acidified with dilute sulfuric acid and the starch ester product recovered by means of an alcohol precipitation procedure so as to remove residual salts. This derivative was cold water soluble and displayed an outstanding resistance to alkaline hydrolysis.

Our invention is thus seen to provide a novel class of starch ester derivatives which are found to be surprisingly resistant to alkaline hydrolysis. Variations may be made in proportions, procedures and materials without departing from the scope of our invention defined by the following claims.

We claim:
1. Starch derivatives comprising starch esters corresponding to the following formulae:

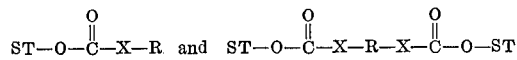

wherein ST represents the starch molecule, X is a radical selected from among the group consisting of oxygen and sulfur radicals and R is a non-polymerizbale radical selected from the group consisting of alkyl and substituted alkyl radicals containing from 1 to 18 carbon atoms, aryl and substituted aryl radicals, and arylalkyl and substituted arylalkyl radicals, the substituent groups present on said substituted alkyl, substituted aryl and substituted arylalkyl radicals being selected from the groups consisting of nitro, amino, sulfo, chloro, bromo, iodo and fluoro radicals.

2. The starch derivatives of claim 1, wherein said derivatives are in granular form.

3. The starch derivatives in claim 1, wherein said derivatives are gelatinized.

References Cited by the Examiner
UNITED STATES PATENTS

| | | | |
|---|---|---|---|
| 2,609,379 | 9/1952 | Gaver et al. | 260—233.5 |
| 2,668,156 | 2/1954 | Caldwell | 260—233.3 |
| 3,165,544 | 1/1965 | Tilles | 260—455 |

LEON J. BERCOVITZ, *Primary Examiner.*

JOSEPH R. LIBERMAN, *Examiner.*

R. JONES, R. W. MULCAHY, *Assistant Examiners.*